Aug. 7, 1945.   L. A. RIEFENSTAHL   2,381,774
METHOD OF MAKING CORK SUBSTITUTE
Filed Dec. 31, 1941
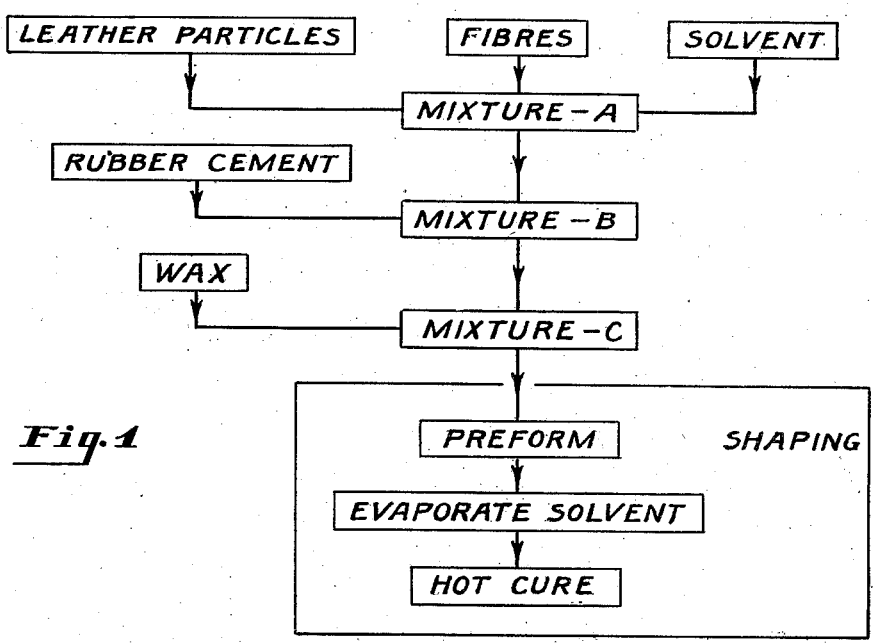
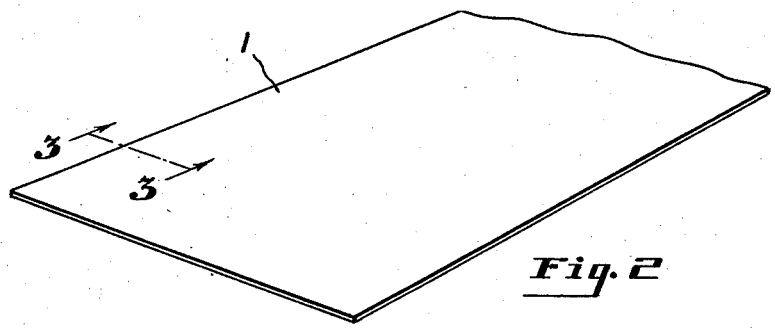
INVENTOR
Lester A. Riefenstahl
BY
Evans + McCoy
ATTORNEYS Patented Aug. 7, 1945

2,381,774

UNITED STATES PATENT OFFICE 2,381,774

METHOD OF MAKING CORK SUBSTITUTE

Lester A. Riefenstahl, Wabash, Ind., assignor to The General Tire & Rubber Company, Akron, Ohio, a corporation of Ohio Application December 31, 1941, Serial No. 425,121

3 Claims. (Cl. 18—48)

This invention relates to a method of making a cork substitute. It particularly relates to a process for making a sheet material which has high resilience and which can be substituted for sheet cork.

Cork in sheet form has long been used as a pre-welt material or as shoe insoles. It is relatively light in weight and has substantial resilience or springiness, which adds substantially to the comfort of the wearer of shoes. Most cork, however, is imported and at the present time it is obtained with great difficulty.

It is an object of the present invention to provide a method of making a material which can be produced in sheet form, and which is relatively light in weight, resilient and has properties superior to those of cork sheets.

It is another object of the present invention to provide a method of making sheet material having properties equal to or superior to those of sheet cork.

Other objects will be apparent from the following description of the invention as illustrated by the drawing, in which:

Fig. 1 is a flow sheet of steps in the preferred process of the present invention;

Fig. 2 is a perspective view of a portion of sheet material embodying the present invention; and Fig. 3 is a sectional view on the line 3—3 of Fig. 1.

In accordance with the present invention, I accomplish the above objects by mixing certain proportions of leather fibers, vegetable fibers and rubbery binding material and then forming the mixture into sheet form in a particular manner. The material is basically leather which is ground or shredded so as to be a relatively long fibrous product. A textile fiber such as cotton fluff, wool, etc., serves to provide longer fibers, which aids in holding the material together and in combination with the leather to provide resilience in the product. The preferred amount of cotton or other textile fiber present depends upon the average length of the leather fibers. When the leather fibers are relatively long a smaller amount of cotton, etc., may be used to obtain the same resilience and strength.

The binding material is preferably a rubber cement having dissolved rubber of high molecular length, as when the cement is prepared from rubber which has not been masticated. The cement may be prepared by adding a substantial amount of solvent to rubber latex and beating the ingredients together at high velocity to cause the solvent to come into intimate contact with the finely divided rubber, swelling the rubber into a continuous phase of rubber swollen by solvent and having a disperse phase of water. Such a cement is also disclosed in application Serial No. 293,103, filed by Russell J. Bush, September 1, 1939. A cement prepared from unmasticated rubber is preferable to one prepared from masticated rubber, although the latter may be used, because the relatively long, unbroken-down molecules of unmasticated rubber have more strength, less plasticity, and more resistance to aging and to the deteriorating effect of the tanning agents in the leather, etc.

In order to increase the tackiness of the binder to leather so that a stronger bond is produced between the components, the cement should contain a tack-producing material, such as a member of the group of pitches and soluble resins, including coumarindene resins, rosin, asphalt, or any of the usually used additions which increase tackiness of rubber compounds.

In order to provide an article having the most desirable appearance and without tackiness, I have found that it is very important to incorporate a relatively small amount of a wax or waxlike material, such as paraffine, ceresin wax, carnauba wax, chlorinated naphthalene, or other soluble natural or artificial waxlike material, into the composition at some time prior to the shaping of the material in the desired form. The wax permits relatively free forming operations and decreases adhesion to forming rolls or plates. It also facilitates the attainment of a smooth surface on the material when it is sheeted out between platens and in the final article counteracts the effect of the tack producer without destroying the adhesion between the comminuted solids and the binder so that it has the feel of cork.

A composition suitable for a pre-welt material should contain at least about 50%, and preferably less than 90%, of shredded leather and superior properties are obtained with about 65% to 80% of shredded leather. The vegetable or textile fibers, which for best results should be of low cross section with a staple length of less than one and one-fourth inch, such as cotton, wool, etc., are preferably present in amounts between about 2% and about 10%. The amount of rubber preferably used as a binder is just sufficient to form a strong union between each fiber. The preferred amount depends upon the strength of the cement, the amount of mastication, etc.; with cements of unmasticated rubber, less rubber is necessary because of its lower plasticity and higher strength. Generally, the most desirable sheet material contains about 10% to 20% of rubber as a binder, but as little as 4% or 5% has been effective; more than about 30% of rubber as a binder in the composition is undesirable because of the decrease in porosity of the material.

In the preparation of the mixture to be formed the dry rubber and vegetable fibers are mixed together and wetted with a rubber solvent, such as naphtha, mineral spirits, gasoline, etc. A rubber cement which serves as the binding ingredient is then thoroughly mixed with the wetted solids and the wax is then preferably incorporated in the mixture, generally as a solution of wax in a rubber solvent.

The wetting of the solids prior to the incorporation of the cement is important as it prevents too much absorption of a solvent from the cement and improves the bond between the cement and the solids.

The wax for best results should be added after the cement has been mixed with solids although it may be incorporated in the cement so that there is less tendency to coat the solids with any material which prevents adhesion to the cement. The preferred amount of wax is about 5% to 10% of the rubber in the composition. The effect of wax in diminishing the tackiness of the rubber and of the composition is, however, noticeable in material formed between hot platens when as little as .5% (based on the rubber) is present. As much as 15% or 20% of wax based on the rubber may be used without too greatly decreasing the strength of the binding material.

The shaping of the mixture so that the shaped material has a smooth surface together with high resilience should be carried out in two steps. The plastic is preferably preformed by pressing it between cold preforming means, such as cold forming platens, or between rolls. The preformed mixture is allowed to dry for a sufficient time to permit evaporation of substantially all of the solvent. The preformed material is then pressed between hot platens, hot calenders, or other hot surfacing means, just sufficiently to obtain a smooth surface. If the cement contains curing agents such as sulfur or accelerator the rubber of the binder may be vulcanized. I have found, however, that with a cement of an unmasticated rubber as above described the material has sufficient elasticity to substantially prevent bunching or plastic flow in shoes, even though the rubber is not vulcanized.

The following example illustrates the invention: A rubber cement was first prepared by thoroughly mixing 40 ounces of a 60% rubber latex, 2¼ gallons of rubber solvent, such as naphtha or mineral spirits, and 8% of wood rosin. The mixing was done at high speed so as to drive the solvent through the aqueous layer surrounding the rubber particles in the latex, causing them to swell and form a continuous phase of unmasticated rubber swollen by solvent and a disperse phase of water. The wood rosin serves to increase the tackiness of the cement and increases the bond between the cement and leather. It was first mixed with the solvent prior to forming the cement. About 26 ounces of leather fibers, prepared by shredding scrap leather and 5.5 ounces of cotton fluff, were separately mixed with about 10 ounces of naphtha or gasoline so that the solids were thoroughly wetted by the naphtha. About 55 ounces of the above cement were then mixed with the wetted solids until a homogeneous mixture was formed. About 4 or 5 ounces of a 10% solution of paraffine wax in naphtha were then thoroughly incorporated in the mixture.

The plastic mixture thus formed was pressed between cold platens, using a frame to get a thickness of about 1/16". It was then removed from between the platens and allowed to dry until substantially all the naphtha had evaporated. The dried material was then pressed between hot platens for a sufficient time to give a smooth surface. The slab I produced looked like cork sheet, but it was stronger and more resilient. The comminuted leather 2, which constitutes the major proportion of the slab 1, and the fibers 3 are firmly bonded by the rubbery binder 4.

In the above example the cement may be substituted by other cements prepared either from a masticated rubber, vulcanizable synthetic rubber, or synthetic rubbery polymers, including the copolymers of butadiene with styrene, acrylic nitrile, or other resin forming material which contains a vinyl group, plasticized vinyl resins, polychloroprene, etc. In the claims, the term "rubbery binding material" is intended to include only polymeric materials of this general type; it does not include materials which are not true polymers, such as sulfurized oils, vulcanized bitumens and pitches. The paraffine may be substituted by other soluble waxlike materials. The rosin may be substituted by other known tack producers, such as pitches, certain soluble resins, etc.

Furthermore, it is to be understood that the particular form of product shown and described, and the particular procedure set forth are presented for purposes of explanation and illustration, and that various modifications of said product and procedure can be made without departing from my invention as defined in the appended claims.

What I claim is:

1. A method of preparing a relatively light weight leather base material, comprising forming a mixture of comminuted leather, fibrous material and a rubber solvent, mixing a rubber cement with the wet solids, incorporating a waxlike material into the mixture, preforming the mixture between cold preforming means, permitting a major portion of the solvent to evaporate, and then forming the preformed material to a smooth surface between a hot surfacing means.

2. A method of preparing a relatively light weight leather base sheet material, comprising forming an intimate mixture containing essentially about 50 to 90 parts of shredded leather, 2 to 10 parts of vegetable fibers, and about 5 to 35 parts of a rubber dissolved in solvent, preforming the mixture between cold platens, permitting evaporation of the major portion of solvent to cause migration of a substantial proportion of soluble constituents of said material to exposed surfaces thereof, and then pressing the preformed mixture between hot platens to provide a smooth surface.

3. A method of preparing a non-tacky relatively light-weight leather base sheet material, comprising forming a mixture of the shredded leather, a fibrous material in a rubber solvent, mixing a rubber cement containing a volatile solvent with the mixture thus prepared, incorporating a waxlike material of a type which is soluble in said volatile solvent within said mixture, preforming the mixture between relatively cool preforming means, permitting a major portion of the solvent to evaporate from exposed surfaces of said material to cause a substantial proportion of the waxlike material to migrate to the vicinity of the exposed surfaces, and thereafter pressing the preformed mixture with hot forming means to provide a smooth surface, said preformed material being characterized by resembling sheeted cork and having a smooth non-tacky feel.

LESTER A. RIEFENSTAHL.